(12) United States Patent
Raykar et al.

(10) Patent No.: US 12,346,918 B2
(45) Date of Patent: Jul. 1, 2025

(54) DETERMINING LOCATIONS FOR OFFERINGS USING ARTIFICIAL INTELLIGENCE

(71) Applicant: International Business Machines Corporation, Armonk, NY (US)

(72) Inventors: Vikas C. Raykar, Bangalore (IN); Surya Shravan Kumar Sajja, Bangalore (IN); Nupur Aggarwal, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 17/690,194

(22) Filed: Mar. 9, 2022

(65) Prior Publication Data
US 2023/0289832 A1   Sep. 14, 2023

(51) Int. Cl.
G06Q 30/02     (2023.01)
G06N 20/20     (2019.01)
(Continued)

(52) U.S. Cl.
CPC ......... *G06Q 30/0202* (2013.01); *G06N 20/20* (2019.01); *G06Q 30/0201* (2013.01)

(58) Field of Classification Search
None
See application file for complete search history.

(56) References Cited

U.S. PATENT DOCUMENTS 8,494,915 B2 * 7/2013 Mesaros ............... G06Q 50/01
                                                    705/26.1
9,280,777 B2    5/2016 Bilicki et al.
(Continued)

FOREIGN PATENT DOCUMENTS

CN    111931052 B  *  9/2023  ......... G06F 16/2465
WO    2003094068 A1    11/2003

OTHER PUBLICATIONS

G. Christoforidis, P. Kefalas, A. N. Papadopoulos and Y. Manolopoulos, "Recommending Points of Interest in LBSNs Using Deep Learning Techniques," 2019 IEEE International Symposium on INnovations in Intelligent SysTems and Applications (INISTA), Sofia, Bulgaria (Year: 2019).*

(Continued)

*Primary Examiner* — Jerry O'Connor
*Assistant Examiner* — Philip N Warner
(74) *Attorney, Agent, or Firm* — Ryan, Mason & Lewis, LLP (57) ABSTRACT

Methods, systems, and computer program products for determining locations for offerings using artificial intelligence are provided herein. A computer-implemented method includes determining an initial sub-set of one or more enterprise locations, from a set of multiple enterprise locations, for providing at least one enterprise offering; determining at least one sequential ordering of one or more additional ones of the multiple enterprise locations for providing the at least one enterprise offering by processing data related to the initial sub-set of one or more enterprise locations using an artificial intelligence engine that utilizes one or more artificial intelligence techniques; and automatically training at least a portion of the artificial intelligence engine that utilizes the one or more artificial intelligence techniques based at least on feedback data pertaining to provision of the at least one enterprise offering to the at least one sequential ordering of one or more additional enterprise locations.

20 Claims, 5 Drawing Sheets

(51) Int. Cl.
*G06Q 30/0201* (2023.01)
*G06Q 30/0202* (2023.01)

(56) References Cited

U.S. PATENT DOCUMENTS

| | | | | |
|---|---|---|---|---|
| 10,846,638 | B1* | 11/2020 | Macha | G06F 3/048 |
| 11,232,383 | B1* | 1/2022 | Burns, Sr. | G06Q 10/0637 |
| 11,361,349 | B1* | 6/2022 | Smith | G06Q 30/0282 |
| 11,425,054 | B1* | 8/2022 | Dunsmore | H04L 47/828 |
| 11,605,041 | B2* | 3/2023 | Shannon | G06Q 10/06375 |
| 2002/0099678 | A1* | 7/2002 | Albright | G06Q 30/02 |
| | | | | 706/45 |
| 2008/0306821 | A1 | 12/2008 | Fell et al. | |
| 2009/0276403 | A1* | 11/2009 | Tamayo | G06F 16/2465 |
| 2015/0371283 | A1* | 12/2015 | Chevrier | G06Q 30/0269 |
| | | | | 705/14.66 |
| 2016/0300252 | A1* | 10/2016 | Frank | G06F 21/6245 |
| 2018/0315078 | A1* | 11/2018 | Rapperport | G06Q 30/0267 |
| 2019/0188212 | A1* | 6/2019 | Miller | H04L 63/145 |
| 2020/0126127 | A1* | 4/2020 | Narayanam | G06Q 30/0271 |
| 2020/0294108 | A1* | 9/2020 | Perry | G06N 20/00 |
| 2021/0097467 | A1* | 4/2021 | Liang | G06Q 10/04 |
| 2021/0103945 | A1* | 4/2021 | Montero | G06Q 30/0206 |
| 2021/0232934 | A1* | 7/2021 | Lai | G06N 20/00 |
| 2022/0067626 | A1* | 3/2022 | Unnikrishnan | G06Q 10/0639 |
| 2022/0121884 | A1* | 4/2022 | Zadeh | G06N 3/006 |
| 2022/0292543 | A1* | 9/2022 | Henderson | G06Q 30/0252 |
| 2022/0366494 | A1* | 11/2022 | Cella | H04L 9/50 |
| 2023/0042210 | A1* | 2/2023 | Yee | G06F 9/466 |
| 2023/0185791 | A1* | 6/2023 | Chaudhuri | G06F 16/221 |
| | | | | 707/692 |

OTHER PUBLICATIONS

Lee et al., Technological Forecasting and Social Change, Pre-launch new product demand forecasting using the Bass model: A statistical and machine learning-based approach, Jul. 2014.

LumenLearning.com, Merchandise Planning Process, https://courses.lumenlearning.com/wmopen-retailmanagement/chapter/introduction-to-the-merchandise-planning-process/, accessed Mar. 8, 2022.

McAteer et al., Google, Data-driven merchandising: Moving from an art to a science to reach today's shopper, https://www.thinkwithgoogle.com/marketing-strategies/search/product-inventory-merchandising/ Mar. 2019.

Caro et al., Dynamic assortment with demand learning for seasonal consumer goods. Management Science, 53(2):276-292, 2007.

Rendle, Steffen. "Factorization machines." 2010 IEEE International Conference on Data Mining. IEEE, 2010.

Rendle, et al., "BPR: Bayesian personalized ranking from implicit feedback." arXiv preprint arXiv:1205.2618 (2012).

Zhang et al., "Discrete ranking-based matrix factorization with self-paced learning." Proceedings of the 24th ACM SIGKDD International Conference on Knowledge Discovery & Data Mining. 2018.

Liu et al., "Deep reinforcement learning based recommendation with explicit user-item interactions modeling." arXiv preprint arXiv:1810.12027 (2018).

Google, Matrix Factorization, https://developers.google.com/machine-learning/recommendation/collaborative/matrix, accessed Mar. 8, 2022.

\* cited by examiner

DETERMINING LOCATIONS FOR OFFERINGS USING ARTIFICIAL INTELLIGENCE

BACKGROUND

The present application generally relates to information technology and, more particularly, to data processing techniques. More specifically, one or more enterprises (e.g., within retail industries such as fashion-related enterprises) are heavily trend-driven, with new products and/or services being introduced on a regular and/or periodic basis (e.g., every month, every season, every year, etc.). Additionally, many such enterprises operate and/or coordinate multiple locations (e.g., multiple commercial stores distributed throughout one or more geographic regions), and the introduction of new products and/or services can be carried out in phases across certain portions of the multiple locations (e.g., a retailer may initially launch a new product at a select few store locations before potentially expanding the launch into other store locations).

The determination and/or decision of which locations to begin such introductions, as well as which locations to expand such introductions to subsequently, presents challenges related to resource allocation, costs, etc. For example, conventional approaches often rely on the intuition of one or more enterprise personnel, which is prone to human error and can cause misallocation of resources, delays, unnecessary costs, etc.

SUMMARY

In at least one embodiment, techniques for determining locations for offerings using artificial intelligence are provided. An example computer-implemented method can include determining an initial sub-set of one or more enterprise locations, from a set of multiple enterprise locations, for providing at least one enterprise offering, and determining at least one sequential ordering of one or more additional ones of the multiple enterprise locations for providing the at least one enterprise offering by processing data related to the initial sub-set of one or more enterprise locations using an artificial intelligence engine that utilizes one or more artificial intelligence techniques. The method can also include automatically training at least a portion of the artificial intelligence engine that utilizes the one or more artificial intelligence techniques based at least on feedback data pertaining to provision of the at least one enterprise offering to the at least one sequential ordering of one or more additional enterprise locations.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes automatically determining locations for enterprise offerings using artificial intelligence techniques. Such an embodiment includes employing at least one data-driven technique to automatically determine which locations (e.g., stores) to launch and/or expand one or more enterprise offerings (e.g., one or more new products) in a sequential manner. One or more embodiments additionally include using partial data to perform one or more subsequent rollouts and/or expansions of enterprise offerings to locations in a phased manner. With respect to partial data, consider a scenario wherein a matrix is built, and each element of the matrix $D_{ij}$ is filled with first week (or month) sales of product i in store j to generate an input data matrix. It is possible in such a scenario that only a few elements of this matrix are available because not all stores are chosen to launch all products, and hence, such a scenario produces and/or results in partial data.

Accordingly, and as further detailed herein, one or more embodiments include automatically determining and/or selecting an initial subset (e.g., an optimal subset) of one or more locations to introduce one or more enterprise offerings based at least in part on analysis of historical data, and subsequently automatically determining and/or selecting a next top-K locations (e.g., in a rolling fashion) to introduce the one or more enterprise offerings by processing at least a portion of data associated with offering introductions at the initial subset of locations.

In at least one embodiment, a partial data matrix D includes historical sales data of some products in some stores, and such data are also associated with some features of the products and some features of the stores. Accordingly, such an embodiment includes utilizing a data matrix D with side information of features. This data matrix can be completed (i.e., by filling-in the missing entries in D) through one or more matrix completion and/or factorization techniques, which can use at least a portion of the side information. Based on the completed entries in D, one or more embodiments include generating the next top-K stores to launch the product(s), as further detailed herein. Such a process can be further refined based on mean variance-based optimization methods, which can be implemented to factor-in additional variables such as shipping costs and other logistics. Additionally or alternatively, in one or more embodiments, such an approach can be made a sequential process through reinforcement learning techniques.

By way of further example, at least one embodiment includes sequentially conducting one or more pilot studies for each enterprise offering to be introduced (e.g., each new product) by determining an initial sub-set of enterprise locations (e.g., stores). By way merely of example, the initial decision of launching some products in some stores can be utilized as a pilot study. An initial pilot study can be based, for example, on intuition of merchandizers if there is no data available. However, in one or more embodiments, if data are available related to some of the products being sold in some of the stores, then such data can be used to build a pilot study using matrix completion techniques which use features of products and stores. Accordingly, in such an embodiment, any new product or store can be handled based on similarities with the available initial dataset. Such pilot studies can enable, for example, testing related to the given enterprise offering(s) by gathering initial data such as sales data, costs, returns, etc. The sub-set of one or more initial locations can be chosen, for example, such that there is a minimum guarantee of certain profits during the pilot studies. At least one embodiment can include facilitating and/or ensuring a minimum guarantee of profits by incorporating one or more logistical costs in the optimization of the top-K locations for launch.

Additionally, in one or more embodiments, feedback (e.g., sales data) collected from the one or more initial locations in the pilot studies can be used to automatically determine and/or predict data (e.g., sales data) related to expansion of at least a portion of the one or more offerings to one or more remaining enterprise locations. As further detailed herein, a pilot study can facilitate the generation of a data matrix D with missing entries, and implementation of matrix completion techniques with respect to matrix D can provide the necessary demand predictions for all of the products in all of the stores. Further, in such an embodiment, such determinations and/or predictions can be leveraged to initiate expansion of at least a portion of the one or more offerings to at least a portion of the one or more remaining enterprise locations.

As also further detailed herein, one or more embodiments include utilizing and/or leveraging multiple artificial intelligence-based data analysis components. Such components can include, for example, one or more matrix factorization-based offering forecasts using matrix factorization techniques in conjunction with side information. As used herein, side information can refer to one or more features of a given product or a given store. In one or more embodiments, such features are tabular in form and can be based on the taxonomy of the product, an image of the product, and/or a description of the product. For stores, demographic information related to the store, square footage of the store, etc., can be used as side information.

Based at least in part on output(s) of such matrix factorization techniques, one or more embodiments include optimizing for enterprise location selection while considering one or more enterprise-related parameters (e.g., maintaining certain profit measures) using one or more mean-variance optimization techniques. Additionally, at least one embodiment can include further processing such enterprise location selection optimization to determine a sequential ordering of enterprise locations (e.g., a structured list in which one enterprise location is identified as most preferred, followed by one or more other identified enterprise location that are relatively less preferred, followed by subsequent enterprise locations that are even less preferred, etc.) for introduction and/or expansion of one or more enterprise offerings using one or more reinforcement learning techniques.

One or more embodiments can also include modifying such a sequential ordering of enterprise locations based at least in part on processing data related to one or more enterprise parameters (e.g., sales, geography, demographics, etc.). Accordingly, and as further detailed herein, one or more embodiments include solving an enterprise offering-location introduction optimization problem using one or more matrix completion methods. At least one embodiment can also include generating and/or utilizing an optimization formulation based at least in part on a trade-off between profits and logistic costs (e.g., shipping costs, inventory costs, etc.) to determine an optimal number of enterprise locations in which to introduce one or more particular enterprise offerings.

By way merely of illustration, consider an example embodiment wherein an enterprise offering (e.g., a new product) is launched at a subset of K enterprise locations (e.g., stores), wherein K is chosen randomly or based at least in part on one or more enterprise parameters. Such an example embodiment includes monitoring and/or processing data pertaining to sales of all enterprise offerings at all enterprise locations for a fixed time period (e.g., one week, one month, etc.). For each enterprise offering, such an example embodiment includes learning a ranking function to rank the enterprise locations which have not yet received a given enterprise offering (e.g., a new product), wherein the ranking function forecasts the sales of the given enterprise offering in the fixed time period if the given enterprise offering had been launched at a given enterprise location.

Further, such an example embodiment includes selecting the top-K enterprise locations for the given enterprise offering and initiating the launch of the given enterprise offering in at least a portion of the top-K enterprise locations. Such an example embodiment can additionally include subsequently monitoring and/or processing data pertaining to sales of all enterprise offerings at all enterprise locations for another fixed time period (e.g., one additional week, one additional month, etc.), and repeating at least a portion of the above-noted steps until the end of a given temporal parameter (e.g., a given season), until exhaustion of a given portion of enterprise inventory, etc.

At least one embodiment includes implementing one or more collaborative filtering techniques. By way of example, such an embodiment can include creating a matrix of the total sales in a first given temporal period (e.g., the first week, the first month, etc.), since the launch of a given enterprise offering, for every enterprise offering at a given enterprise location. For offerings not carried at a particular enterprise location, such matrix entries would be missing and/or left blank. As such, one or more embodiments include solving a matrix completion problem using one or more collaborative filtering algorithms.

As noted above and further detailed herein, at least one embodiment includes implementing one or more matrix factorization techniques in connection with side information. In such an embodiment, one or more latent factors (also referred to herein as side information) for each enterprise offering and/or each enterprise location can be learned and/or determined to facilitate generating matrix factorization-based sales predictions.

Additionally or alternatively, one or more embodiments include implementing factorization machines, which represent a generalization of matrix factorization methods which can handle side information (e.g., enterprise offering features, enterprise location information, etc.). By way of example, in such an embodiment, a model equation for a factorization machine with observation $R(i, j)$ can be stated as: $R(i,j)=\mu+w_i+w_j+a^T x_i+b^T y_j+u_i^T v_j$, wherein μ represents a global bias term, $w_i$ represents the weight term for enterprise offering i, $w_j$ represents the weight term for enterprise location j, $x_i$, T represents a transpose of the vector (or matrix), and $y_j$ represents the enterprise offering side feature vectors and the enterprise location side feature vectors, and a and b represent, respectively, the weight vectors for the enterprise offering side feature vectors and the weight vectors for the enterprise location side feature vectors. The latent factors, which are vectors of length r, are given by $u_i$ and $v_j$. Also, parameter r can be tuned, for example, based at least in part on one or more accuracy measurements.

As also detailed herein, at least one embodiment includes implementing one or more automated ranking functions. By way of example, one such automated ranking function includes generating multiple bootstrapped versions of a given dataset (e.g., a dataset related to sales of one or more given enterprise offerings and one or more given enterprise locations) to learn multiple models. Bootstrapped versions of a given dataset will result in different subsets of the original data and will lead to different models. The predictions from at least a portion of the models are then used to generate a given prediction interval (e.g., a 95% prediction interval). As noted above, each bootstrapped dataset will lead to a different model and a different prediction, and the set of all such predictions can lead to a prediction band, with the mean prediction given by the average of all such predictions. Also, for example, in such an embodiment, multiple enterprise locations can be ranked using the lower limit of the prediction interval, which ensures that the mean prediction is sufficiently high and, at the same time, the prediction interval sufficiently narrow.

By way of additional example, another automated ranking function includes a Bayesian personalized ranking from implicit feedback. In such an embodiment, a Bayesian analysis of the optimized ranking problem leads to a maximum posterior estimator for optimal personalized ranking, in connection with a learning method based at least in part on stochastic gradient descent with bootstrap sampling (e.g., LearnBPR, which uses a stochastic gradient-descent algorithm based on bootstrap sampling of training triples).

Yet another automated ranking function includes discrete ranking-based matrix factorization with self-paced learning. Such a ranking function is based at least in part on cross-entropy loss between a true pairwise preference ranking and a predicted pairwise preference ranking for each user (that is, each product or offering).

Additionally or alternatively, one or more embodiments include optimization of a K-value (that is, the number of enterprise locations identified and/or selected for launch and/or expansion of one or more enterprise offerings) through mean variance optimization. By way of example, for a given enterprise offering i, forecasted demand at N enterprise locations can be given by $d_{i1}, d_{i2}, \ldots, d_{iN}$ such that $d_{ij} \in N(\mu_{ij}, \sigma_{ij}^2)$. Also, in this equation, $d_{ij}$ refers to the demand of the $i^{th}$ offering at the $j^{th}$ location, and $d_{ij} \in N(\mu_{ij}, \sigma_{ij}^2)$ indicates that an assumption is being made that the demands are normally distributed with mean demand $\mu_{ij}$ and variance $\sigma_{ij}^2$. Also, in such an example embodiment, let $x_j \in \{0,1\}$ be a binary variable indicating the presence or absence of the $j^{th}$ enterprise location in a selection. Accordingly, such an embodiment includes deciding and/or determining the values of binary variables $x_1, x_2, \ldots, x_N$ such that $$\sum_{j=1}^{N} x_j = K \leq N.$$

Also, total predicted sales can be computed as $$S = \sum_{j=1}^{N} x_j \cdot d_{ij} = x^T d,$$

and mean and variance of sales can be computed, respectively, as $\mu = x^T \mathbb{E}[d]$ and $\sigma^2 = x^T \text{Var}[d] x$.

Additionally or alternatively, in such an embodiment, Markovitz mean-variance portfolio optimization formulation can be used to solve for the optimal selection of enterprise locations x via: $\max_x (\mu - \sigma^2)$. Once the optimal value of x* is determined, then the optimal value of K can be computed as:

$$K = \sum_{j=1}^{N} x_j^*.$$

Also, as used in these equations, x refers to the vector of binary variables $x_1, x_2, \ldots, x_N$, such that $x_j \in \{0,1\}$, and x also indicates the presence or absence of the $j^{th}$ enterprise location in a selection, while x* indicates the optimal value of x.

At least one embodiment can also include incorporating enterprise-related variables such as, for example, shipping costs associated with one or more enterprise offerings. By way merely of example, such shipping costs can be determined as a function of distance between the given enterprise location and the corresponding distribution center $D_j$, the weight of each unit of the given enterprise offering $w_j$, transportation modes and/or carriers available and prices corresponding thereto $t_j$, and the number of units of the given enterprise offering to be transferred d. For simplicity of exposition, consider an example use case wherein shipping cost of transporting a given enterprise offering to a given enterprise location j is defined as function of distance, the number of units, and the variable $x_j$ as: $S(D_j, w_j, t_j, d_j)$.

At least one embodiment can also include incorporating an enterprise-related variable such as shipping costs as part of an objective function. For example, if price data for the given enterprise offering is available and the price of enterprise offering i is $p_i$, the optimization problem can be formulated as: $\max_x p_i(\mu-\sigma^2) - \Sigma_{j=1,\ldots,N} S(D_j, w_j, t_j, d_j) \cdot x_j$. Instead of minimizing the shipping costs, such an embodiment can include imposing shipping costs as a constraint by bounding the shipping costs as: $\max_x (\mu-\sigma^2)$, such that $\Sigma_{j=1,\ldots,N} S(D_j, w_j, t_j, d_j) \cdot x_j \leq L$.

As detailed herein, one or more embodiments include solving and/or modeling an enterprise location selection problem as a sequential decision-making problem, in which the decision-maker (e.g., an agent) interacts with users/customers (e.g., an environment) through enterprise offerings by suggesting a list of enterprise locations to launch such offerings sequentially over a set of timesteps, by maximizing the cumulative rewards of the selection procedure. More specifically, in such an embodiment, the selection procedure can be modeled by a Markov decision process (MDP) as follows.

A state s is the representation of an enterprise offering's sales history in enterprise locations in a given time period (e.g., the first week after launch), as well as one or more of the enterprise offering's features (if such information exists in the dataset(s)). An action a is a continuous parameter vector denoted as a $a \in \mathbb{R}^{1 \times K}$, wherein $\mathbb{R}$ represents a set of real numbers. In at least one embodiment, each enterprise location has an embedding $v_s \in \mathbb{R}^{1 \times K}$ which has a ranking score, which is defined as the inner product of the action and the item embedding (i.e., $v_s a^T$). Accordingly, in such an embodiment, a given number (e.g., K) of the top ranked enterprise locations will be recommended and/or selected.

Additionally, in such an embodiment, the state is modeled as the representation of the given enterprise offering's sales history. As such, once sales data are recorded in the one or more given enterprise locations, the transition p can be determined. Given the selection based on the action a and the user state s, customers can provide feedback through purchases, and the selection system can receive immediate reward(s) R(s, a) according to such feedback. Also, in at least one embodiment, a discount rate $\gamma \in [0, 1]$ is a factor measuring the present value of long-term rewards. By way merely of example, in the case of $\gamma=0$, the decision-making system considers only immediate rewards, but long-term rewards are ignored. On the other hand, when $\gamma=1$, the recommender treats immediate rewards and long-term rewards as equally important.

Figure 1:
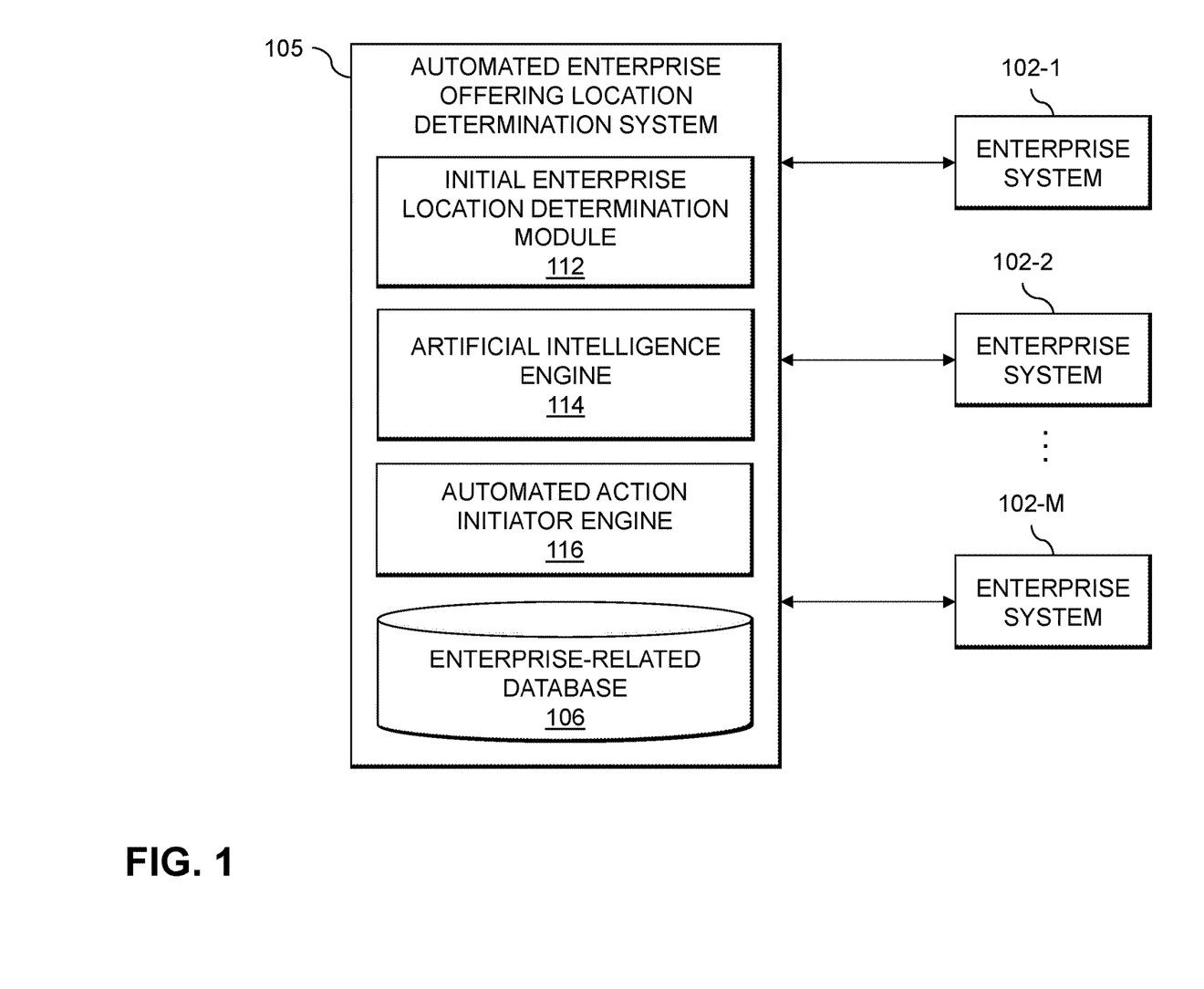
FIG. 1 is a diagram illustrating system architecture, according to an example embodiment of the invention.

FIG. 1 is a diagram illustrating system architecture, according to an embodiment of the invention. By way of illustration, FIG. 1 depicts enterprise systems 102-1, 102-2, . . . 102-M (collectively referred to herein as "enterprise systems 102"), which interact with automated enterprise offering location determination system 105. As also depicted in FIG. 1, automated enterprise offering location determination system 105 includes initial enterprise location determination module 112, artificial intelligence engine 114, automated action initiator engine 116, and enterprise-related database 106. In at least one example embodiment, enterprise systems 102 (e.g., processing devices associated with one or more enterprise locations) can provide various enterprise-related data (e.g., data pertaining to a given enterprise offering, data pertaining to particular enterprise locations, data pertaining to costs, etc.) to automated enterprise offering location determination system 105 for processing in connection with a task of automatically determining a sequential ordering of two or more enterprise locations at which to launch and/or expand a given enterprise offering.

More specifically, by way merely of example, initial enterprise location determination module 112 can process at least a portion of the data provided by enterprise systems 102 to determine an initial sub-set of enterprise locations at which to launch and/or expand a given enterprise offering. In one or more embodiments, at least a portion of such data, as well as one or more previous iterations of similar historical data, can be stored in enterprise-related database 106.

Additionally, artificial intelligence engine 114 can then determine, by processing data associated with the initial launch and/or expansion of the enterprise offering using one or more artificial intelligence techniques (such as further detailed herein), a sequential ordering of additional enterprise locations at which to expand the given enterprise offering. Further, based on such a determination, automated action initiator engine 116 can initiate one or more automated actions such as, for example, training and/or updating at least a portion of the artificial intelligence engine that utilizes the one or more artificial intelligence techniques used by artificial intelligence engine 114, outputting one or more notifications to at least a portion of the enterprise systems 102 regarding the sequential ordering determination, etc.

Figure 2:
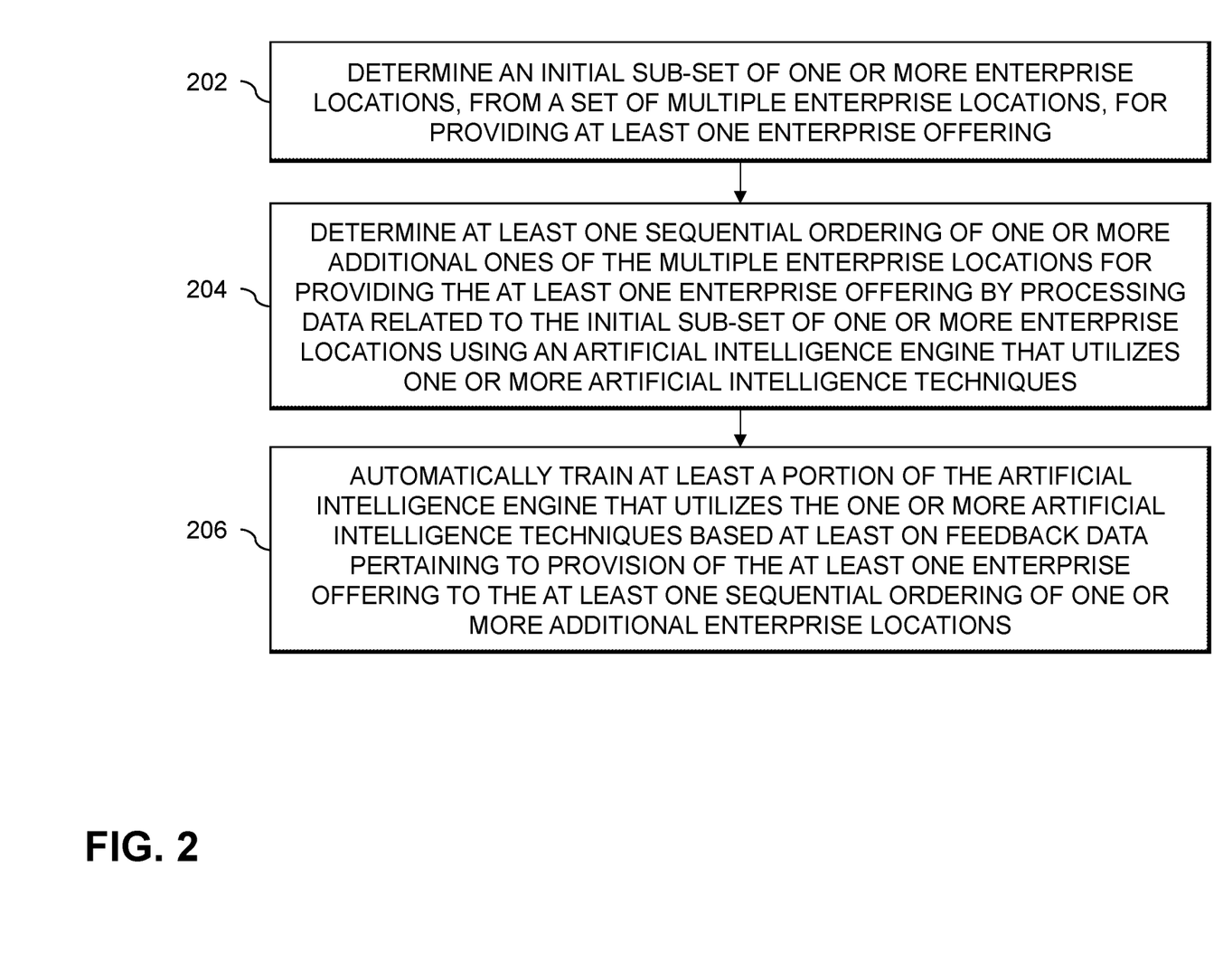
FIG. 2 is a flow diagram illustrating techniques according to an example embodiment of the invention.

FIG. 2 is a flow diagram illustrating techniques according to an embodiment of the present invention. Step 202 includes determining an initial sub-set of one or more enterprise locations, from a set of multiple enterprise locations, for providing at least one enterprise offering. In one or more embodiments, determining an initial sub-set of one or more enterprise locations includes processing data related to one or more of sales of the at least one enterprise offering and costs associated with the at least one enterprise offering. Additionally or alternatively, providing at least one enterprise offering can include newly introducing the at least one enterprise offering and/or expanding provision of the at least one enterprise offering.

Step 204 includes determining at least one sequential ordering of one or more additional ones of the multiple enterprise locations for providing the at least one enterprise offering by processing data related to the initial sub-set of one or more enterprise locations using an artificial intelligence engine that utilizes one or more artificial intelligence techniques. In at least one embodiment, processing data related to the initial sub-set of one or more enterprise locations using the artificial intelligence engine that utilizes the one or more artificial intelligence techniques includes processing data related to the initial sub-set of one or more enterprise locations using at least one Bayesian personalized ranking technique. In such an embodiment, processing data related to the initial sub-set of one or more enterprise locations using at least one Bayesian personalized ranking technique can include generating at least one maximum posterior estimator for personalized ranking. Additionally or alternatively, processing data related to the initial sub-set of one or more enterprise locations using at least one Bayesian personalized ranking technique can include implementing a learning method based on at least one stochastic gradient descent technique and at least one bootstrap sampling technique.

In one or more embodiments, processing data related to the initial sub-set of one or more enterprise locations using the artificial intelligence engine that utilizes the one or more artificial intelligence techniques includes processing data related to the initial sub-set of one or more enterprise locations using at least one discrete ranking-based matrix factorization technique with self-paced learning. In such an embodiment, processing data related to the initial sub-set of one or more enterprise locations using at least one discrete ranking-based matrix factorization technique with self-paced learning can include using at least one cross-entropy loss function with respect to at least one true pairwise preference ranking and at least one predicted pairwise preference ranking.

Additionally or alternatively, processing data related to the initial sub-set of one or more enterprise locations using the artificial intelligence engine that utilizes the one or more artificial intelligence techniques further can include processing data related to one or more enterprise-related parameters using one or more mean-variance optimization techniques, processing data related to the initial sub-set of one or more enterprise locations using at least one Markov decision process, and/or processing data related to the initial sub-set of one or more enterprise locations using one or more reinforcement learning techniques.

Step 206 includes automatically training at least a portion of the artificial intelligence engine that utilizes the one or more artificial intelligence techniques based at least on feedback data pertaining to provision of the at least one enterprise offering to the at least one sequential ordering of one or more additional enterprise locations.

Also, in at least one embodiment, the techniques depicted in FIG. 2 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
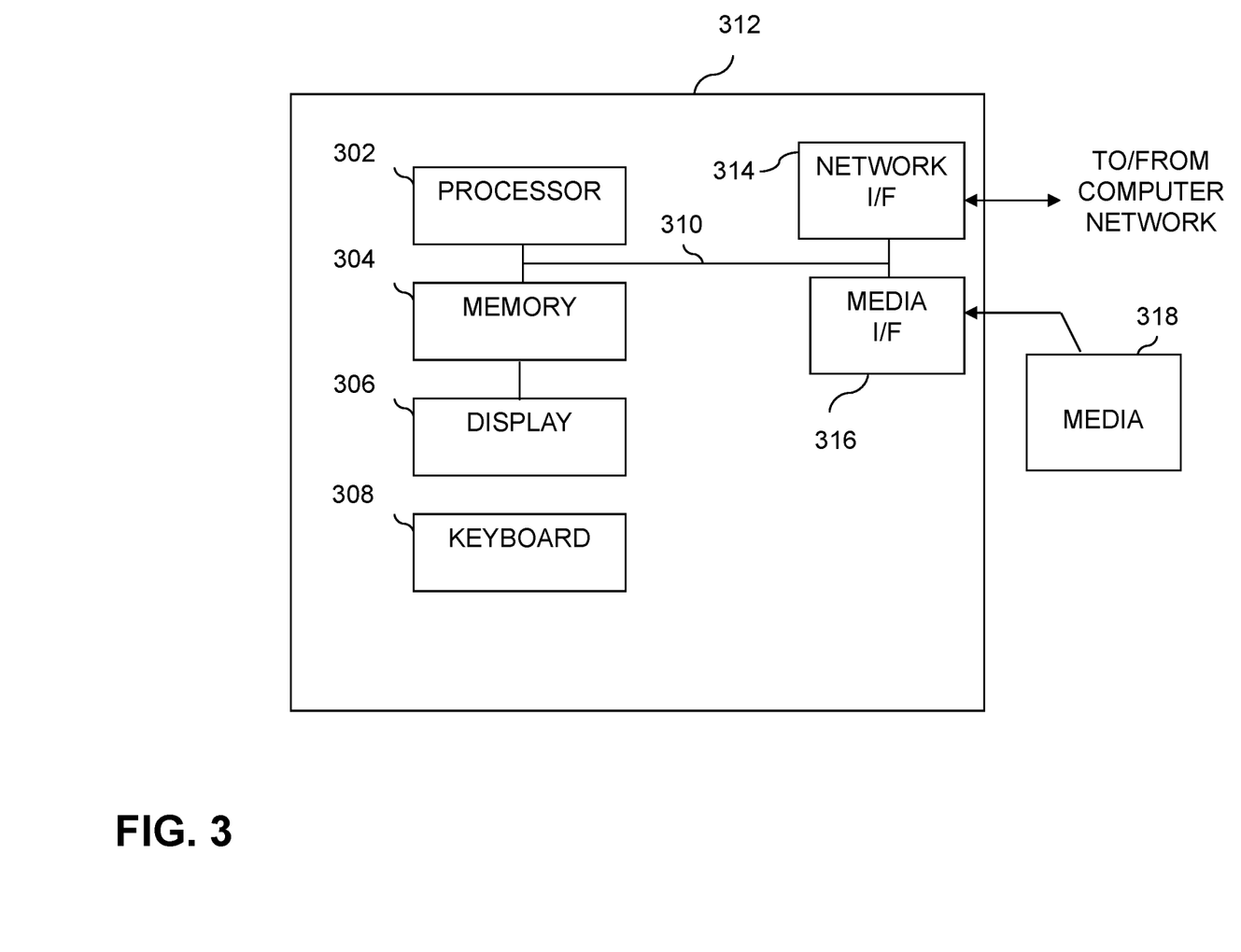
FIG. 3 is a system diagram of an example computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
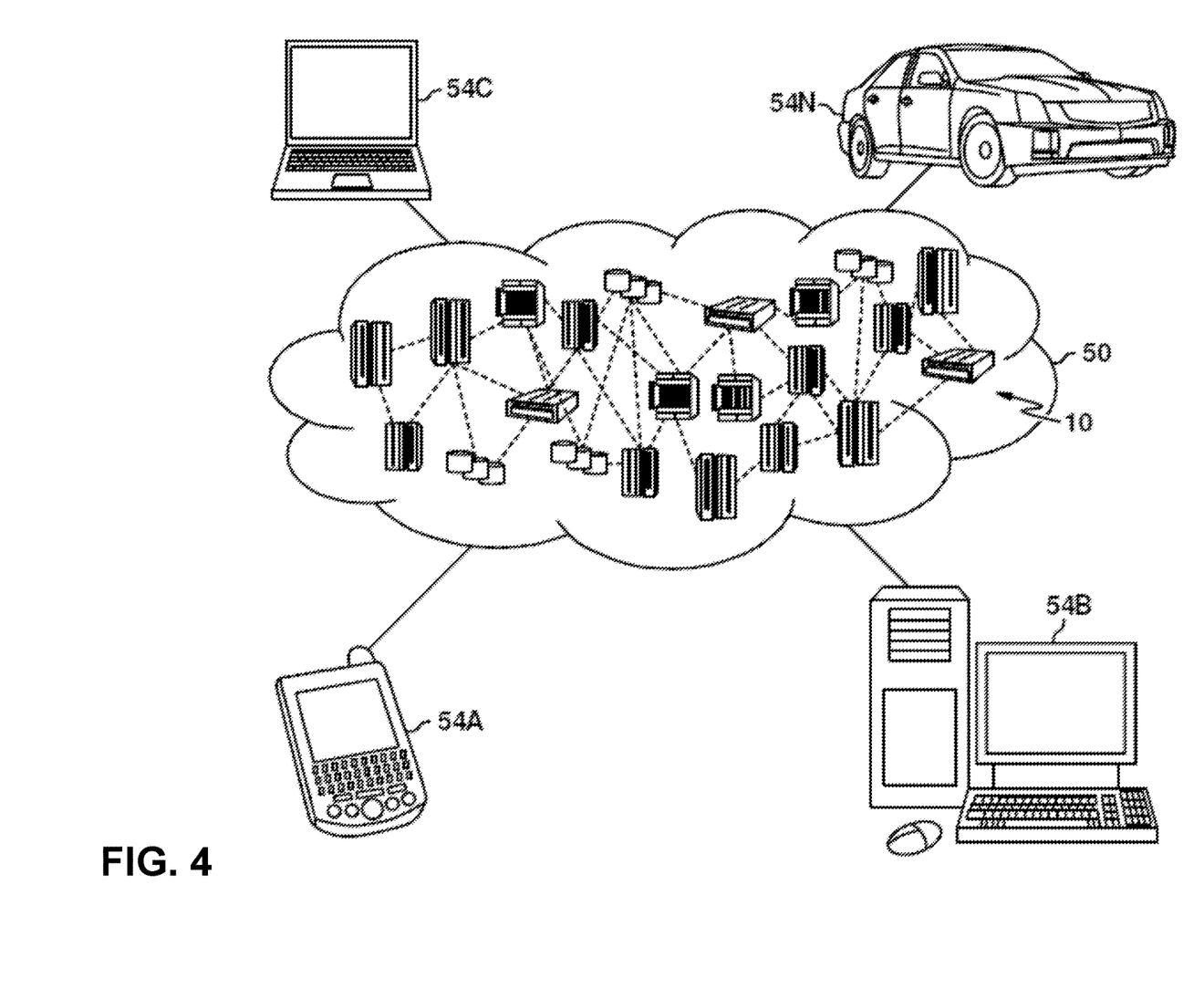
FIG. 4 depicts a cloud computing environment according to an example embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
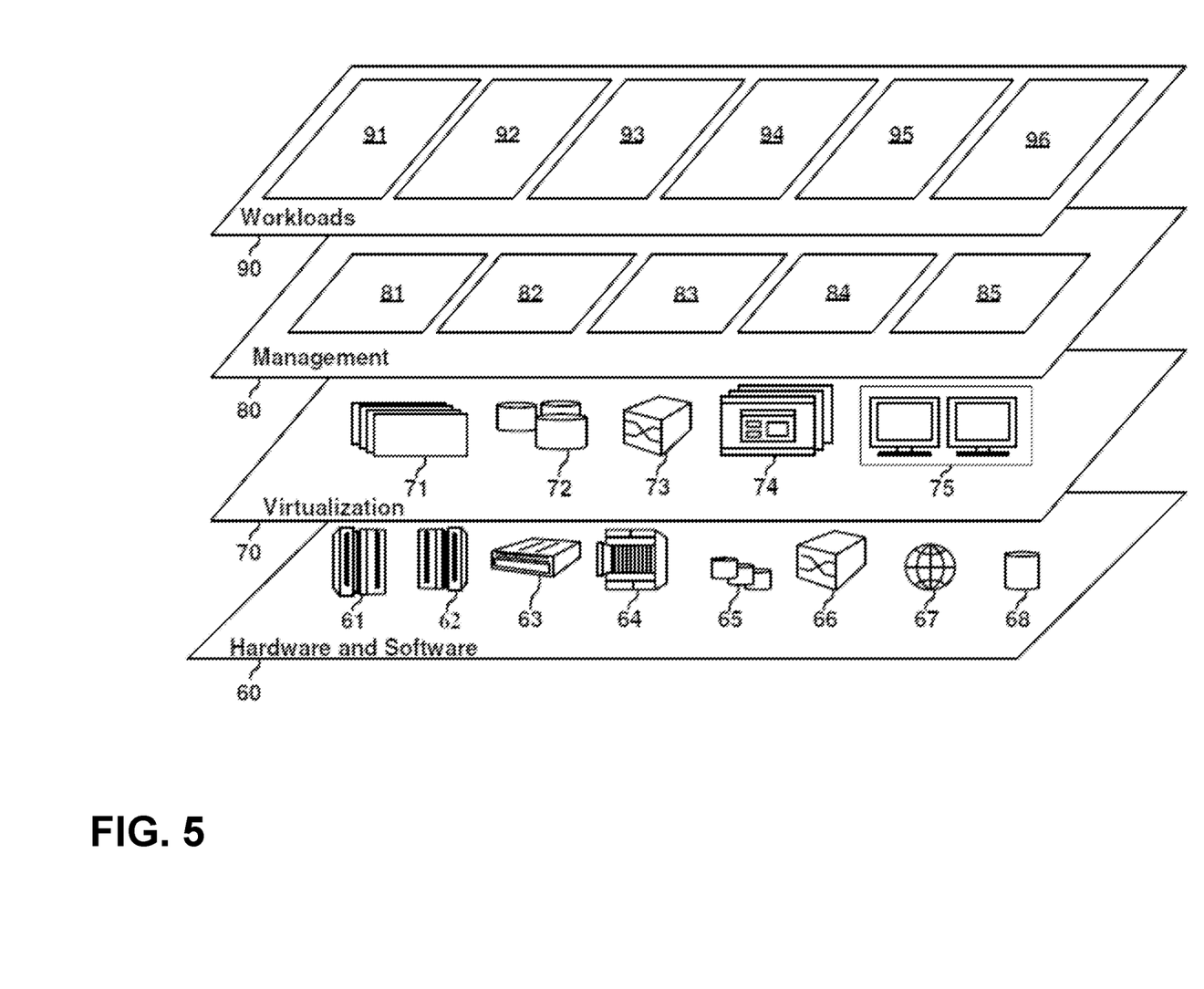
FIG. 5 depicts abstraction model layers according to an example embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise offering location determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically determining optimal locations for enterprise offerings using artificial intelligence techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining an initial sub-set of one or more enterprise locations, from a set of multiple enterprise locations, for providing at least one enterprise offering;
   determining at least one sequential ordering of one or more additional ones of the multiple enterprise locations for providing the at least one enterprise offering by processing data related to the initial sub-set of one or more enterprise locations using an artificial intelligence engine, that utilizes one or more artificial intelligence techniques, wherein determining the at least one sequential ordering comprises:
   (i) implementing one or more machine learning-based bootstrapping techniques which generate multiple distinct versions of portions of the data related to the initial sub-set, wherein at least a plurality of the multiple distinct versions of the portions of the data are processed by the artificial intelligence engine as part of determining the at least one sequential ordering; and
   (ii) generating one or more matrix factorization-based offering forecasts using one or more artificial intelligence-based matrix factorization techniques in conjunction with: information pertaining to one or more features of the at least one enterprise offering and the multiple enterprise locations, at least one weight value assigned to the at least one enterprise offering, weight values assigned to the multiple enterprise locations, at least one non-zero bias value, at least one transpose of at least one matrix generated in connection with the one or more artificial intelligence-based matrix factorization techniques, one or more feature vectors associated with the at least one enterprise offering, and one or more feature vectors associated with the multiple enterprise locations; and
   automatically training at least a portion of the artificial intelligence engine that utilizes the one or more artificial intelligence techniques based at least on feedback data pertaining to provision of the at least one enterprise offering to the at least one sequential ordering of one or more additional enterprise locations, wherein the feedback data comprises sales data associated with at least a portion of the one or more additional enterprise locations and cost data associated with at least a portion of the one or more additional enterprise locations;
   wherein the method is carried out by at least one computing device.

2. The computer-implemented method of claim 1, wherein processing data related to the initial sub-set of one or more enterprise locations using the artificial intelligence engine that utilizes the one or more artificial intelligence techniques comprises processing data related to the initial sub-set of one or more enterprise locations using at least one Bayesian personalized ranking technique.

3. The computer-implemented method of claim 2, wherein processing data related to the initial sub-set of one or more enterprise locations using at least one Bayesian personalized ranking technique comprises generating at least one maximum posterior estimator for personalized ranking.

4. The computer-implemented method of claim 2, wherein processing data related to the initial sub-set of one or more enterprise locations using at least one Bayesian personalized ranking technique comprises implementing a learning method based on at least one stochastic gradient descent technique and at least one bootstrap sampling technique.

5. The computer-implemented method of claim 1, wherein generating one or more matrix factorization-based offering forecasts using one or more artificial intelligence-based matrix factorization techniques in conjunction with information pertaining to one or more features of at least one of the at least one enterprise offering and the multiple enterprise locations comprises processing data related to the initial sub-set of one or more enterprise locations using at least one discrete ranking-based matrix factorization technique with self-paced learning.

6. The computer-implemented method of claim 5, wherein processing data related to the initial sub-set of one or more enterprise locations using at least one discrete ranking-based matrix factorization technique with self-paced learning comprises using at least one cross-entropy loss function with respect to at least one true pairwise preference ranking and at least one predicted pairwise preference ranking.

7. The computer-implemented method of claim 1, wherein processing data related to the initial sub-set of one or more enterprise locations using the artificial intelligence engine that utilizes the one or more artificial intelligence techniques further comprises processing data related to one or more enterprise-related parameters using one or more mean-variance optimization techniques.

8. The computer-implemented method of claim 1, wherein processing data related to the initial sub-set of one or more enterprise locations using the artificial intelligence engine that utilizes the one or more artificial intelligence techniques comprises processing data related to the initial sub-set of one or more enterprise locations using at least one Markov decision process.

9. The computer-implemented method of claim 1, wherein processing data related to the initial sub-set of one or more enterprise locations using the artificial intelligence engine that utilizes the one or more artificial intelligence techniques comprises processing data related to the initial sub-set of one or more enterprise locations using one or more reinforcement learning techniques.

10. The computer-implemented method of claim 1, wherein determining an initial sub-set of one or more enterprise locations comprises processing data related to one or more of sales of the at least one enterprise offering and costs associated with the at least one enterprise offering.

11. The computer-implemented method of claim 1, wherein providing at least one enterprise offering comprises at least one of newly introducing the at least one enterprise offering and expanding provision of the at least one enterprise offering.

12. The computer-implemented method of claim 1, wherein software implementing the method is provided as a service in a cloud environment.

13. A computer program product comprising a computer readable storage medium having program instructions embodied therewith, the program instructions executable by a computing device to cause the computing device to:
determine an initial sub-set of one or more enterprise locations, from a set of multiple enterprise locations, for providing at least one enterprise offering;
determine at least one sequential ordering of one or more additional ones of the multiple enterprise locations for providing the at least one enterprise offering by processing data related to the initial sub-set of one or more enterprise locations using an artificial intelligence engine, that utilizes one or more artificial intelligence techniques, wherein determining the at least one sequential ordering comprises:
(i) implementing one or more machine learning-based bootstrapping techniques which generate multiple distinct versions of portions of the data related to the initial sub-set, wherein at least a plurality of the multiple distinct versions of the portions of the data are processed by the artificial intelligence engine as part of determining the at least one sequential ordering; and
(ii) generating one or more matrix factorization-based offering forecasts using one or more artificial intelligence-based matrix factorization techniques in conjunction with: information pertaining to one or more features of the at least one enterprise offering and the multiple enterprise locations, at least one weight value assigned to the at least one enterprise offering, weight values assigned to the multiple enterprise locations, at least one non-zero bias value, at least one transpose of at least one matrix generated in connection with the one or more artificial intelligence-based matrix factorization techniques, one or more feature vectors associated with the at least one enterprise offering, and one or more feature vectors associated with the multiple enterprise locations; and
automatically train at least a portion of the artificial intelligence engine that utilizes the one or more artificial intelligence techniques based at least on feedback data pertaining to provision of the at least one enterprise offering to the at least one sequential ordering of one or more additional enterprise locations, wherein the feedback data comprises sales data associated with at least a portion of the one or more additional enterprise locations and cost data associated with at least a portion of the one or more additional enterprise locations.

14. The computer program product of claim 13, wherein processing data related to the initial sub-set of one or more enterprise locations using the artificial intelligence engine that utilizes the one or more artificial intelligence techniques comprises processing data related to the initial sub-set of one or more enterprise locations using at least one Bayesian personalized ranking technique.

15. The computer program product of claim 13, wherein generating one or more matrix factorization-based offering forecasts using one or more artificial intelligence-based matrix factorization techniques in conjunction with information pertaining to one or more features of at least one of the at least one enterprise offering and the multiple enterprise locations comprises processing data related to the initial sub-set of one or more enterprise locations using at least one discrete ranking-based matrix factorization technique with self-paced learning.

16. The computer program product of claim 13, wherein processing data related to the initial sub-set of one or more enterprise locations using the artificial intelligence engine that utilizes the one or more artificial intelligence techniques further comprises processing data related to one or more enterprise-related parameters using one or more mean-variance optimization techniques.

17. The computer program product of claim 13, wherein processing data related to the initial sub-set of one or more enterprise locations using the artificial intelligence engine that utilizes the one or more artificial intelligence techniques comprises processing data related to the initial sub-set of one or more enterprise locations using at least one Markov decision process.

18. The computer program product of claim 13, wherein processing data related to the initial sub-set of one or more enterprise locations using the artificial intelligence engine that utilizes the one or more artificial intelligence techniques comprises processing data related to the initial sub-set of one or more enterprise locations using one or more reinforcement learning techniques.

19. The computer program product of claim 13, wherein determining an initial sub-set of one or more enterprise locations comprises processing data related to one or more of sales of the at least one enterprise offering and costs associated with the at least one enterprise offering.

20. A system comprising:

a memory configured to store program instructions; and a processor operatively coupled to the memory to execute the program instructions to:

determine an initial sub-set of one or more enterprise locations, from a set of multiple enterprise locations, for providing at least one enterprise offering;

determine at least one sequential ordering of one or more additional ones of the multiple enterprise locations for providing the at least one enterprise offering by processing data related to the initial sub-set of one or more enterprise locations using an artificial intelligence engine, that utilizes one or more artificial intelligence techniques, wherein determining the at least one sequential ordering comprises:

(i) implementing one or more machine learning-based bootstrapping techniques which generate multiple distinct versions of portions of the data related to the initial sub-set, wherein at least a plurality of the multiple distinct versions of the portions of the data are processed by the artificial intelligence engine as part of determining the at least one sequential ordering; and         (ii) generating one or more matrix factorization-based offering forecasts using one or more artificial intelligence-based matrix factorization techniques in conjunction with: information pertaining to one or more features of the at least one enterprise offering and the multiple enterprise locations, at least one weight value assigned to the at least one enterprise offering, weight values assigned to the multiple enterprise locations, at least one non-zero bias value, at least one transpose of at least one matrix generated in connection with the one or more artificial intelligence-based matrix factorization techniques, one or more feature vectors associated with the at least one enterprise offering, and one or more feature vectors associated with the multiple enterprise locations; and     automatically train at least a portion of the artificial intelligence engine that utilizes the one or more artificial intelligence techniques based at least on feedback data pertaining to provision of the at least one enterprise offering to the at least one sequential ordering of one or more additional enterprise locations, wherein the feedback data comprises sales data associated with at least a portion of the one or more additional enterprise locations and cost data associated with at least a portion of the one or more additional enterprise locations.

\* \* \* \* \*